US009879862B2

(12) United States Patent
McCormick et al.

(10) Patent No.: US 9,879,862 B2
(45) Date of Patent: Jan. 30, 2018

(54) GAS TURBINE ENGINE AFTERBURNER

(71) Applicant: Rolls-Royce North American Technologies, Inc., Indianpolis, IN (US)

(72) Inventors: Keith A. McCormick, Indianapolis, IN (US); Timothy C. Roesler, Plainfield, IN (US); Albert J. Verdouw, Indianapolis, IN (US)

(73) Assignee: Rolls-Royce North American Technologies, Inc., Indianapolis, IN (US)

( * ) Notice: Subject to any disclaimer, the term of this patent is extended or adjusted under 35 U.S.C. 154(b) by 1014 days.

(21) Appl. No.: 14/196,857

(22) Filed: Mar. 4, 2014

(65) Prior Publication Data
US 2015/0121886 A1 May 7, 2015

Related U.S. Application Data

(60) Provisional application No. 61/775,107, filed on Mar. 8, 2013, provisional application No. 61/793,317, filed on Mar. 15, 2013.

(51) Int. Cl.
*F23R 3/20* (2006.01)
*F02K 3/10* (2006.01)
*F23R 3/52* (2006.01)

(52) U.S. Cl.
CPC ............... *F23R 3/20* (2013.01); *F02K 3/10* (2013.01); *F23R 3/52* (2013.01); *F23R 2900/00015* (2013.01)

(58) Field of Classification Search
CPC ... F02K 3/10; F02K 3/077; F02K 3/11; F02K 3/08; F23R 3/20; F23R 3/18; F23R 3/22;
(Continued)

(56) References Cited

U.S. PATENT DOCUMENTS 683,601 A 12/1900 Henry
2,611,241 A * 9/1952 Schulz .................... F02C 3/045
415/143
(Continued)

FOREIGN PATENT DOCUMENTS

FR 3017445 A1 * 8/2015 ............... F23R 3/20
GB 2040434 A * 8/1980 ............... F23R 3/12
GB 2049915 A * 12/1980 ............... F23R 3/12

OTHER PUBLICATIONS

Aerothermodynamics of Aircraft Engine Components, Gordon C. Oates, AIAA Education Series, Published by AIAA, © 1985, 551 pages, Hardback, ISBN-10: 0-915928-97-3, ISBN-13: 978-0-915928-97-2.
(Continued)

*Primary Examiner* — Moshe Wilensky
(74) *Attorney, Agent, or Firm* — Barnes & Thornburg LLP

(57) ABSTRACT

An afterburner is disclosed for use with a gas turbine engine and, in one form, is structured to receive a bypass air. The afterburner can be situated in a bypass duct and can be a toroidal combustor or a can combustor. In one embodiment, the afterburner includes a combustor arranged to receive bypass air and a plurality of vanes distributed downstream of a turbine of the gas turbine engine. The vanes can include one or more exit apertures through which hot combustion flow from the afterburner combustor can be injected. The exit apertures can be protrusions or slots in some forms. In one embodiment, a cooling passage is arranged around the exit apertures. An upstream vane portion can be positioned to inject fuel to be combusted via interaction with hot flow that is discharged through the exit apertures.

7 Claims, 12 Drawing Sheets

(58) Field of Classification Search
CPC ...... F23R 3/12; F23R 3/14; F23R 3/52; F23R 2900/00015
USPC .......................................... 60/761, 762, 262
See application file for complete search history.

(56) References Cited

U.S. PATENT DOCUMENTS

| | | | | |
|---|---|---|---|---|
| 2,855,754 | A | * | 10/1958 | Giannottl ................. F02C 7/08 60/755 |
| 2,929,203 | A | | 3/1960 | Henning et al. |
| 3,010,281 | A | * | 11/1961 | Cervenka ................ F02C 3/085 60/39.37 |
| 3,240,012 | A | * | 3/1966 | Price ...................... F01D 5/027 415/144 |
| 3,240,016 | A | * | 3/1966 | Price ...................... F01D 5/027 60/745 |
| 3,269,119 | A | * | 8/1966 | Price ...................... F01D 5/027 415/114 |
| 3,303,643 | A | * | 2/1967 | Beardsley ................ F02C 5/00 60/39.76 |
| 3,591,968 | A | * | 7/1971 | Arnett ..................... F02K 3/10 137/871 |
| 3,613,360 | A | * | 10/1971 | Howes ..................... F23R 3/54 60/755 |
| 3,667,221 | A | * | 6/1972 | Taylor ..................... F23R 3/30 261/79.1 |
| 3,701,255 | A | * | 10/1972 | Markowski .............. F01D 5/18 60/762 |
| 3,804,578 | A | * | 4/1974 | Robbins ................... F23R 3/58 431/158 |
| 3,869,864 | A | * | 3/1975 | Bunn ....................... F23R 3/16 60/749 |
| 3,906,718 | A | * | 9/1975 | Wood ...................... F23R 3/12 60/738 |
| 3,931,707 | A | | 1/1976 | Vdoviak |
| 3,961,475 | A | * | 6/1976 | Wood ...................... F23R 3/12 239/432 |
| 4,018,043 | A | * | 4/1977 | Clemmens ............... F23R 3/52 60/39.23 |
| 4,072,008 | A | * | 2/1978 | Kenworth ............... F02K 3/075 60/262 |
| 4,151,709 | A | * | 5/1979 | Melconian ............... F02C 3/14 60/755 |
| 4,170,109 | A | | 10/1979 | Egan et al. |
| 4,203,285 | A | | 5/1980 | Hanloser et al. |
| 4,466,359 | A | * | 8/1984 | Weber ..................... F23M 9/06 110/213 |
| 4,798,048 | A | | 1/1989 | Clements |
| 4,815,283 | A | * | 3/1989 | Eldredge ................. F23R 3/18 60/749 |
| 5,111,655 | A | * | 5/1992 | Shekleton ................ F23R 3/12 60/743 |
| 5,230,214 | A | | 7/1993 | Pechette |
| 5,359,849 | A | * | 11/1994 | Auffret .................... F23R 3/18 60/749 |
| 5,385,015 | A | | 1/1995 | Clements et al. |
| 5,396,763 | A | | 3/1995 | Mayer et al. |
| 5,488,829 | A | * | 2/1996 | Southall ................... F23R 3/12 60/725 |
| 5,685,142 | A | * | 11/1997 | Brewer .................... F23R 3/20 60/39.821 |
| 5,813,221 | A | | 9/1998 | Geiser et al. |
| 6,098,401 | A | | 8/2000 | Alassoeur et al. |
| 6,192,669 | B1 | * | 2/2001 | Keller ..................... F23R 3/425 60/804 |
| 6,334,303 | B1 | | 1/2002 | Berglund et al. |
| 6,895,756 | B2 | | 5/2005 | Schmotolocha et al. |
| 6,971,239 | B2 | | 12/2005 | Snyder et al. |
| 6,983,601 | B2 | | 1/2006 | Koshoffer |
| 7,013,635 | B2 | | 3/2006 | Cohen et al. |
| 7,093,442 | B2 | | 8/2006 | Lovett |
| 7,127,897 | B2 | * | 10/2006 | Carrea ..................... F23R 3/52 60/722 |
| 7,137,255 | B2 | * | 11/2006 | Schmotolocha ......... F02K 3/10 60/761 |
| 7,168,253 | B1 | | 1/2007 | Blanchard et al. |
| 7,225,623 | B2 | | 6/2007 | Koshoffer |
| 7,237,385 | B2 | * | 7/2007 | Carrea ..................... F23R 3/52 60/776 |
| 7,318,317 | B2 | * | 1/2008 | Carrea ..................... F23R 3/52 60/804 |
| 7,437,876 | B2 | | 10/2008 | Koshoffer |
| 7,467,518 | B1 | | 12/2008 | Vermeersch |
| 7,475,546 | B2 | | 1/2009 | Snyder et al. |
| 7,568,346 | B2 | | 8/2009 | Roberts et al. |
| 7,596,950 | B2 | | 10/2009 | Woltmann et al. |
| 7,600,383 | B2 | | 10/2009 | Bunel et al. |
| 8,011,188 | B2 | * | 9/2011 | Woltmann ............... F23R 3/12 60/761 |
| 8,209,987 | B2 | | 7/2012 | Hautman et al. |
| 8,302,404 | B2 | * | 11/2012 | Nilsson ................... F23C 7/004 239/399 |
| 2005/0268618 | A1 | * | 12/2005 | Johnson .................. F23R 3/286 60/776 |
| 2009/0056340 | A1 | * | 3/2009 | Woltmann ............... F23R 3/12 60/765 |
| 2009/0260366 | A1 | | 10/2009 | Bunel et al. |
| 2010/0126177 | A1 | | 5/2010 | Hautman et al. |
| 2015/0121886 | A1 | * | 5/2015 | McCormick ............ F23R 3/52 60/762 |

OTHER PUBLICATIONS

A Semi-Empirical Correlation of Afterburner Combustion Efficiency and Lean-Blowout Fuel-Air-Ratio Data With Several Afterburner-Inlet Variables and Afterburner Lengths, Charles R. King, NACA Research Memorandum E57F26.
"Effect of swirling flow on augmentor performance," Clements, T.R., 1974, NASA-CR-134639.
"Effect of swirling flow on augmentor performance, phase 2," Clements, T.R., 1976, NASA-CR-135024.
"Design and verification of a turbofan swirl augmentor," Egan, W. J., Jr.; Shadowen, J. H., 1978, AIAA Paper 78-1040.
Lee et al., "The GE-NASA RTA Hyperburner Design and Development", NASA/TM-2005-213803, Jun. 2005 (22 pages).

* cited by examiner

GAS TURBINE ENGINE AFTERBURNER

CROSS REFERENCE TO RELATED APPLICATIONS

This application claims priority to and the benefit of U.S. Provisional Patent Application No. 61/775,107, filed 8 Mar. 2013, and of U.S. Provisional Application No. 61/793,317, filed 15 Mar. 2013, the disclosures of which are both now expressly incorporated herein by reference.

TECHNICAL FIELD

The present disclosure generally relates to gas turbine engine afterburners. More particularly, but not exclusively, the present disclosure relates to gas turbine engine afterburner pilots.

BACKGROUND

Providing augmented thrust to gas turbine engines remains an area of interest. Some existing systems have various shortcomings relative to certain applications. Accordingly, there remains a need for further contributions in this area of technology.

SUMMARY

The present disclosure may comprise one or more of the following features and combinations thereof.

One embodiment of the present disclosure is a gas turbine engine afterburner. Other embodiments include apparatuses, systems, devices, hardware, methods, and combinations for providing piloting to gas turbine engine afterburners. Further embodiments, forms, features, aspects, benefits, and advantages of the present application shall become apparent from the description and figures provided herewith.

DETAILED DESCRIPTION OF THE ILLUSTRATIVE EMBODIMENTS

Figure 1:
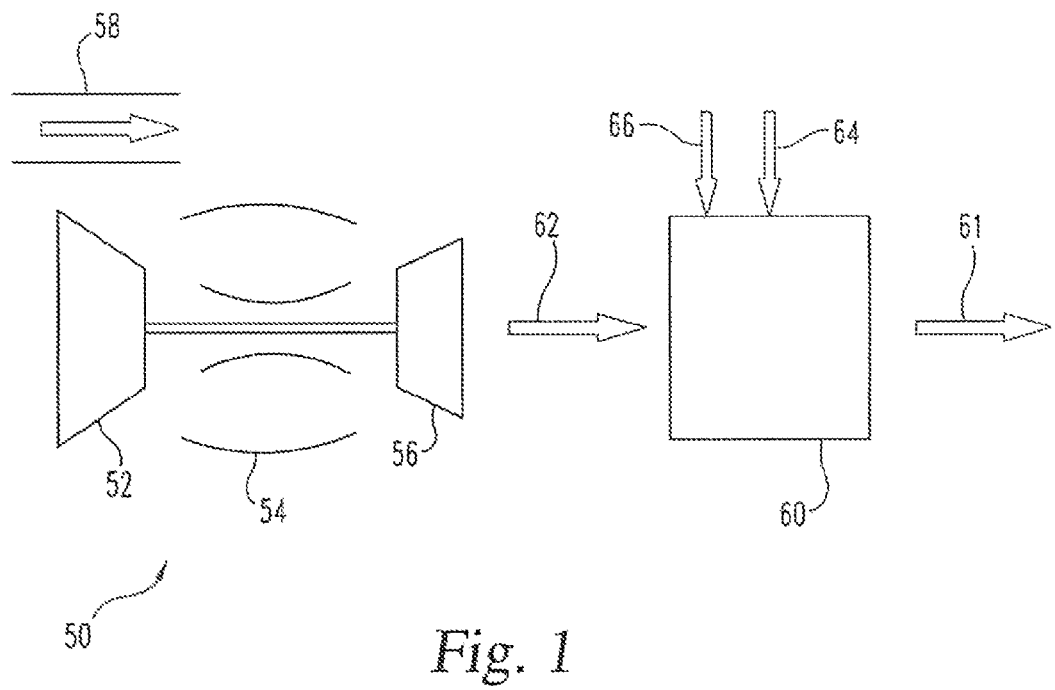
FIG. 1 depicts an embodiment of a gas turbine engine.

For the purposes of promoting an understanding of the principles of the disclosure, reference will now be made to the embodiments illustrated in the drawings and specific language will be used to describe the same. It will nevertheless be understood that no limitation of the scope of the disclosure is thereby intended. Any alterations and further modifications in the described embodiments, and any further applications of the principles of the disclosure as described herein are contemplated as would normally occur to one skilled in the art to which the disclosure relates.

With reference to FIG. 1, one embodiment of a gas turbine engine 50 includes a compressor 52, a combustor 54, and a turbine 56 which are used together to provide power. In one form, the gas turbine engine 50 is used to provide power to an aircraft. As used herein, the term "aircraft" includes, but is not limited to, airplanes, unmanned space vehicles having an air breathing stage, fixed wing vehicles, variable wing vehicles, unmanned combat aerial vehicles, tailless aircraft, and other airborne and/or extraterrestrial (spacecraft) vehicles.

The illustrated embodiment also includes a bypass duct 58 which is used to route a working fluid around a core of the gas turbine engine 50 which, in the illustrated embodiment, includes the compressor 52, combustor 54, and turbine 56. In one embodiment, the bypass duct 58 is a fan bypass duct positioned downstream of a fan (not shown). Thus, the embodiment of the gas turbine engine 50 depicted in FIG. 1 can be a turbofan engine, but it will be appreciated that the bypass duct 58 can represent other useful bypass ducts in the gas turbine engine 50 such as, but not limited to, a third stream bypass used in adaptive cycle engines.

During operation of the gas turbine engine 50, a working fluid is received in the compressor 52 and is compressed prior to being delivered to the combustor 54 where it is mixed with fuel and combusted. The turbine 56 is used to receive a flow stream of products of combustion and working fluid from the combustor 54 and is configured to expand the flow stream and extract work to provide power to drive, among other things, the compressor 52. After the turbine 56 has extracted work from the flow stream, the flow stream is delivered to an afterburner 60.

The afterburner 60 is configured to provide additional thrust as a result of engine exhaust 61 being discharged by combusting a fuel and air mixture. The engine exhaust 61 can be discharged immediately downstream of the afterburner 60, but, in some embodiments, the engine exhaust 61 can be routed through a nozzle (not shown) whether of the convergence or the convergent-divergent nozzle configuration. In some forms, the nozzle can include variable geometry features.

The afterburner 60 can be structured as shown to receive working fluid 62 delivered from the turbine 56 as well as a working fluid 64 delivered from the bypass duct 58. A fuel 66 is also delivered to the afterburner 60 and is mixed with working fluid 64 prior to being combusted in the afterburner 60. Various embodiments of the afterburner 60 are shown and discussed further below. As will be appreciated given the discussion a follows, though the afterburner 60 is shown as a schematic in FIG. 1, the embodiments described below will further develop the particular components of the afterburner 60 as well as locations in which the components can be found.

Figure 2:
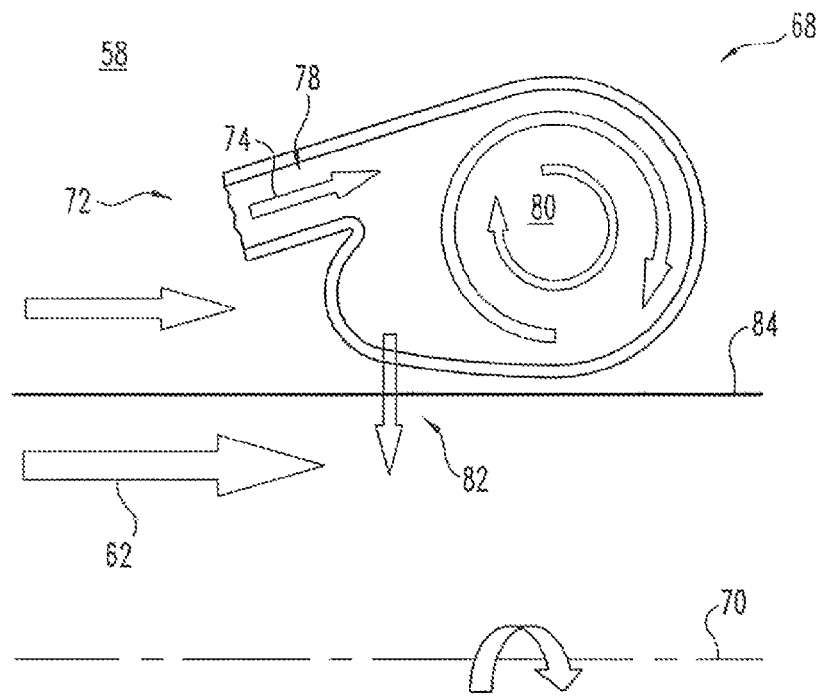
FIG. 2 depicts an embodiment of an afterburner combustor.
Figure 3:
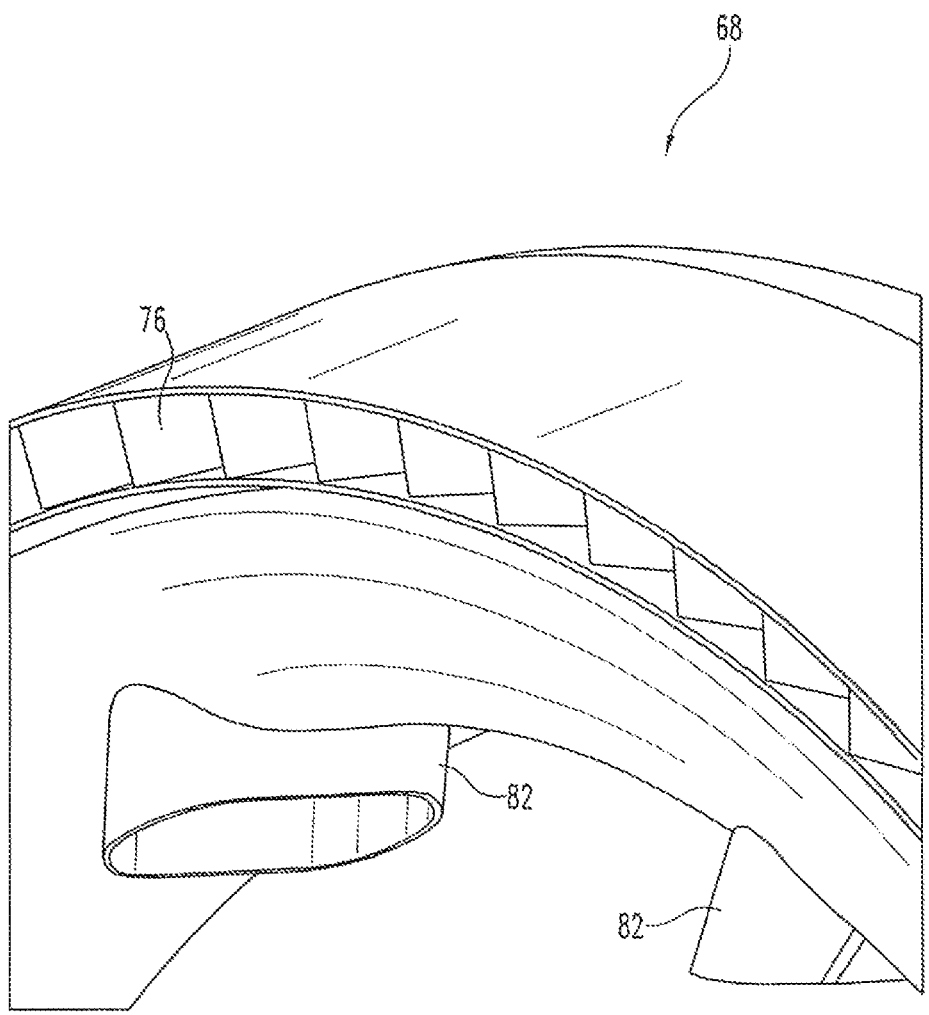
FIG. 3 depicts an embodiment of an afterburner combustor.

Turning now to FIGS. 2 and 3, one embodiment is shown of an afterburner combustor 68 having a toroidal shape that extends about a reference axis 70 and that can be used as one component in a pilot system of an afterburner as will be appreciated given the description herein. The afterburner combustor 68 includes an inlet 72 into which working fluid 74 from the bypass duct 58 is received and delivered to an interior of the afterburner combustor 68. As is seen in FIG. 2, the inlet 72 is positioned on a front side of the afterburner combustor 68 and delivers the working fluid 74 to a top region of the afterburner combustor 68. As used herein relative terms and such as "front", "top", "back", "side", "right", "left", etc. are used for convenience of reference only and are not intended to be limiting unless otherwise stated.

The inlet 72 is annular in shape and includes a plurality of the swirler vanes 76 that assist in imparting a circumferential component of velocity to the working fluid 74. Any number of swirler vanes 76 can be used in the inlet 72 of the afterburner combustor 68 and can be arranged to any degree to impart a desired level of circumferential rotation of the working fluid 74.

A fuel injector 78 is disposed in the inlet 72 and is configured to deliver a fuel to be mixed with the working fluid 74 prior to being combusted within the afterburner combustor 68. The fuel injector 78 can be positioned between adjacent swirler vanes 76 and can be positioned in a variety of locations such as in a leading edge region of one or both of the swirler vanes 76, near a trailing end of one or both of the swirler vanes 76, any location intermediate the two, as well as any other suitable location. Fuel injectors 78 used in one portion of the afterburner combustor 68 can be placed in different locations relative to fuel injectors 78 in other portions of the afterburner combustor 68. Any number of fuel injectors 78 can be used around the annulus of the afterburner combustor 68. Furthermore, any variety of distributions of fuel injectors 78 can also be provided. For example, the fuel injectors 78 can occupy a space between all adjacent swirler vanes 76. In other embodiments, the fuel injectors 78 can be positioned in every other space provided between adjacent swirler vanes 76. Furthermore, not all embodiments of the afterburner combustor 68 need include a symmetric distribution of fuel injector 78. In some forms, the afterburner combustor 68 may include a heavier density of fuel injectors 78 in certain circumferential locations. Any variety of locations, distributions, etc. of fuel injectors 78 is contemplated in the instant application.

A suitable ignition source (not shown) such as a spark igniter, among other potential igniters, can be used to ignite a mixture of working fluid 74 and fuel delivered through the fuel injector 78. The ignition source can be placed in a variety of locations in the afterburner combustor 68 such that a combustion process develops and progresses in a swirling motion that includes radial and axial components as depicted on the right side of FIG. 2 as well as includes motion about the reference axis 70 in the circumferential direction.

Combustion region 80 is created to the right side of the inlet 72 as depicted in FIG. 2. A combustion region 80 is characterized at least in part by an annular vortex of swirling fluid in which a combustion process proceeds. The combustion region 80 is a region which may generate and retain hot products of combustion prior to being discharged from the afterburner combustor 68. Depending upon the relative fuel and working fluid quantities, the annular vortex can include a mixture of products of combustion and an amount of working fluid 74 that is not consumed by the combustion process.

An outlet 82 is formed in the bottom of the afterburner combustor 68 and is used to discharge the hot products of combustion from the afterburner combustor 68. The outlet 82, as shown, is formed on a similar lateral side of the afterburner combustor 68 as is the inlet 72. The outlet 82 can be annular in shape in some embodiments, and, in other embodiments, can include a plurality of discrete outlet discharges, an example of which is shown in FIG. 3. No limitation is intended, unless otherwise indicated to the contrary, that any given outlet 82 associated with any given embodiment of the afterburner combustor 68 described herein is either annular or includes a plurality of discrete outlets. The outlet 82 in the illustrated embodiment is generally arranged to discharge fluid from the afterburner combustor 68 in a radially inward direction toward the flow path which conveys the working fluid 62.

As shown in the non-limiting illustrated embodiment, the afterburner combustor 68 is located in the bypass duct 58 and delivers fluid from the combustion region 80 to the flow path that conveys the working fluid 62. Wall 84 separates the bypass duct 58 from the flow path that conveys a working fluid 62 and can represent a casing or other structure that separates flow paths. In one embodiment, the flow path that flows the working fluid 62 depicted in the illustrated embodiment is a core flow path associated with the compressor, combustor, and turbine, but other flow paths other than a core flow path are also contemplated. In addition, the bypass duct 58 can be a fan bypass duct, a third stream bypass duct, or any other duct that can be used to bypass fluid from the core of the gas turbine engine 50 as was discussed above.

Figure 4:
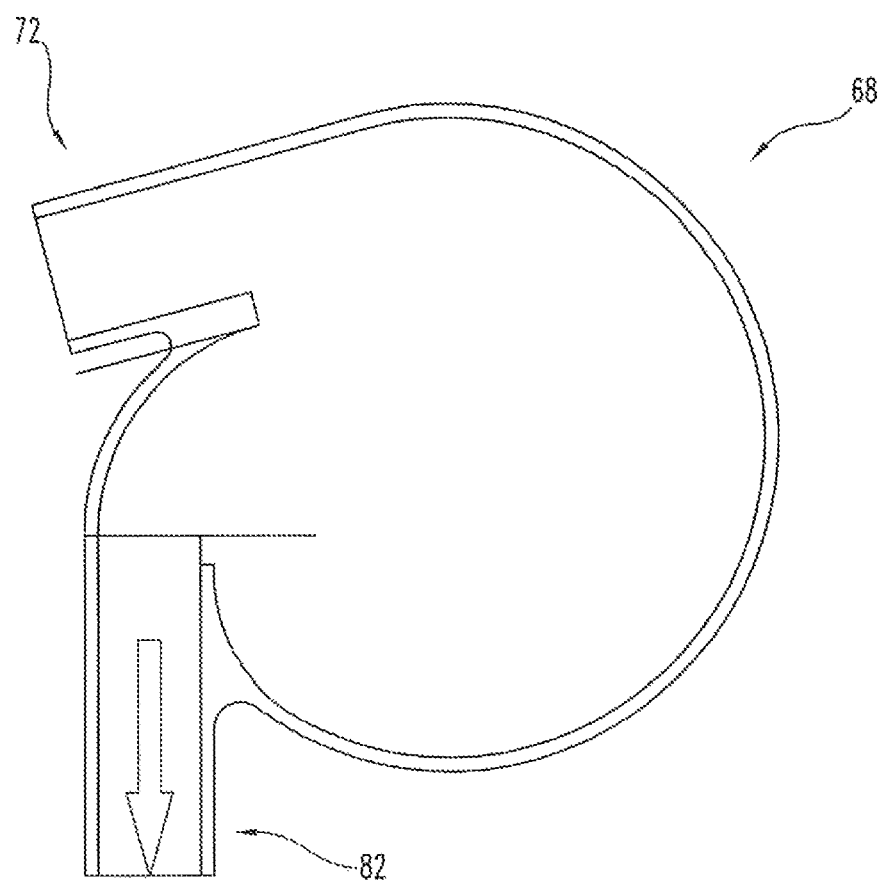
FIG. 4 depicts an embodiment of an afterburner combustor.
Figure 5:
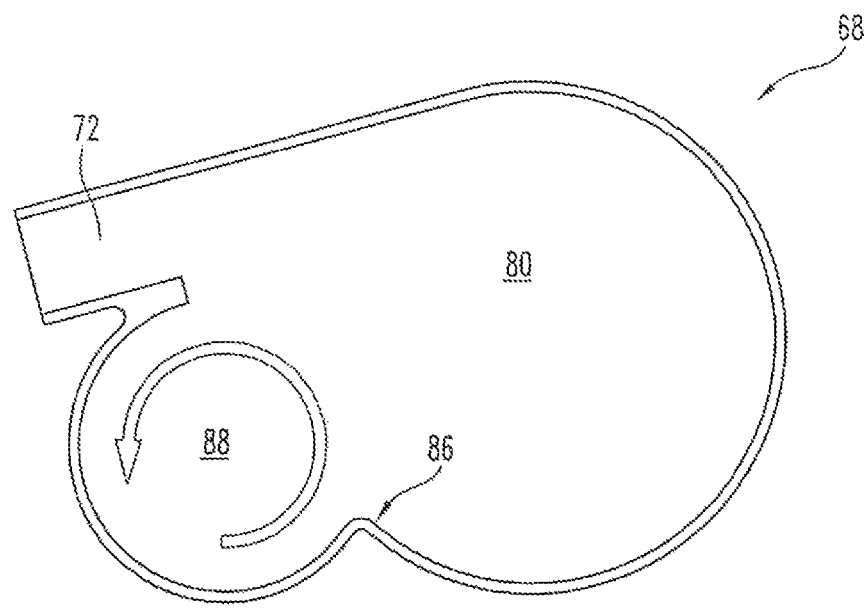
FIG. 5 depicts an embodiment of an afterburner combustor.
Figure 6:
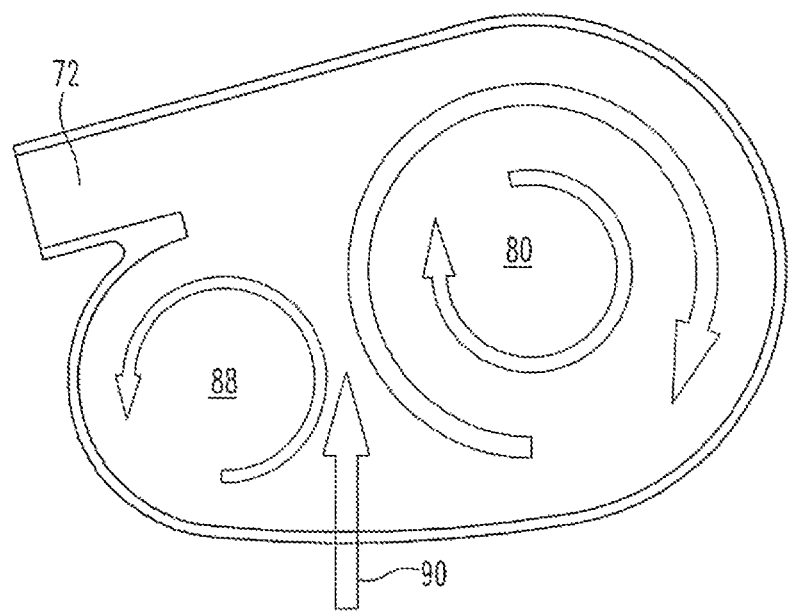
FIG. 6 depicts an embodiment of an afterburner combustor.

Turning now to FIGS. 4, 5, and 6, various other embodiments of the afterburner 68 are illustrated. FIG. 4, for example, discloses an afterburner combustor 68 in which the outlet 82 is arranged as an annular outlet. FIG. 5 illustrates an embodiment of afterburner combustor 68 that includes a structural protrusion 86 that is used to isolate the combustion region 80 from an exhaust region 88. Protrusion 86 can take any variety of forms and can protrude any given amount into the internal space of the afterburner combustor 68 sufficient to develop separate combustion region 80 and exhaust region 88. FIG. 6 discloses an alternative and/or additional embodiment in which an injected working fluid 90 is used to separate the combustion region 80 from the exhaust region 88. The injected working fluid 90 can be delivered to the internal space of the afterburner combustor 68 at any variety of flow rates, temperatures, and pressures sufficient to separate the combustion region 80 from the exhaust region 88.

In some embodiments of the instant application, the afterburner combustor 68 includes a plurality of discrete outlets 82. The afterburner combustor 68 can be coupled with a number of afterburner vanes structured to act as a flame holder and include one or more discharge openings through which hot products of combustion from the afterburner combustor 68 can be discharged into the flow path that conveys the working fluid 62.

Figure 7:
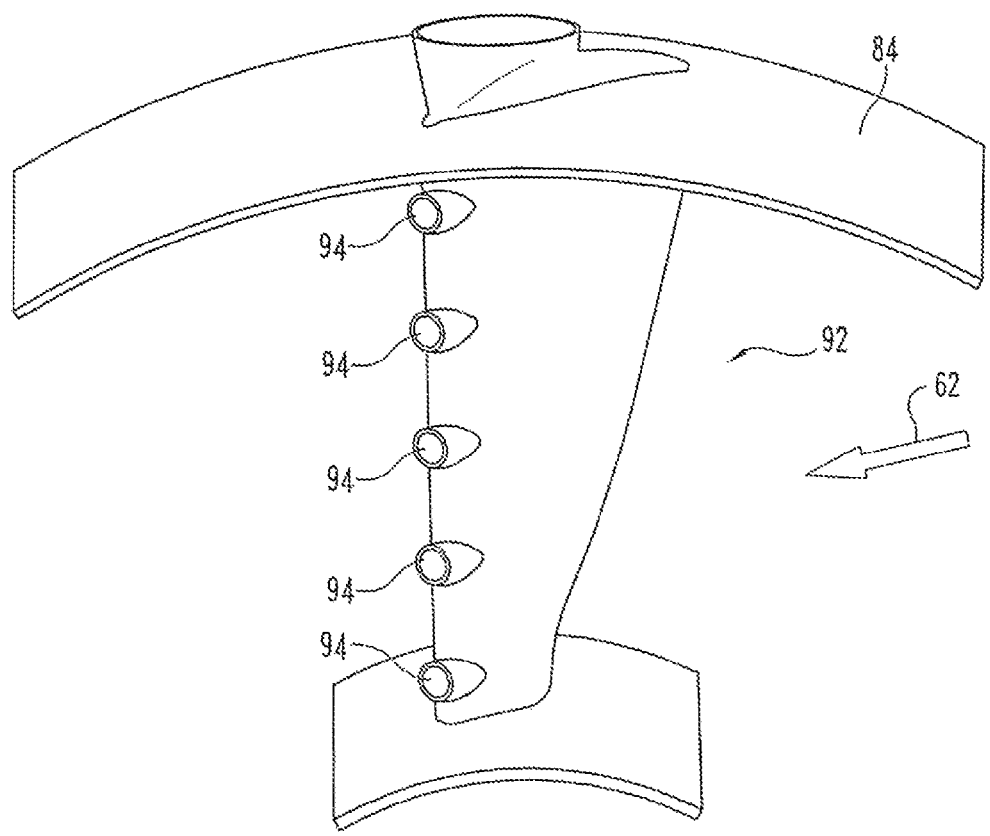
FIG. 7 depicts an embodiment of an afterburner flame holder.

Turning now to one embodiment of such afterburner vane, FIG. 7 discloses an embodiment in which a plurality of discharge openings 94 can be arrayed along a trailing edge portion of an afterburner vane 92. The discharge openings 94 generally extend from a surface of the afterburner vane 92 and are generally arranged to convey hot products of combustion in an axial direction. The discharge openings 94 can be arranged coincident with a chord line of the afterburner vanes 92, but in some forms, the discharge openings 94 can be offset from the chord line of the afterburner vane 92.

In other additional and/or alternative forms, the discharge openings 94 can be angled relative to a chord line of the afterburner vane 92 and/or one or more discharge openings 94 can be arranged at an angle relative to a reference axis of the gas turbine engine 50 such that the afterburner vane 92 and/or one or more discharge openings 94 include a circumferential component through which hot combustion gases are exhausted through the discharge openings 94. For example, the afterburner vane 92 can be used to increase and/or decrease a swirling motion of working fluid 62 via its configuration relative to a reference axis of the gas turbine engine 50. Additionally and/or alternatively, one or more of the discharge openings 94 can also be included to impart and/or discourage swirling motion. The discharge openings 94 can have varying levels of offset, angle, etc. In one form the discharge openings 94 are arranged as a function of span location.

The discharge openings 94 in the illustrated embodiment are generally shown as circular in nature extending a small amount away from the afterburner vane 92, but it will be appreciated that the discharge opening 94 can have any variety of other shapes, configurations, lengths, etc. To set forth just a few non-limiting examples, the discharge openings 94 can include a cross-section that changes from one geometric shape to another, the discharge openings 94 can extend any variety of distances away from the afterburner vane 92, and the outer surface that defines the protrusion forming the discharge openings 94 can take any variety of sizes and configurations. In addition, any number of discharge openings 94 can be formed in the afterburner vane 92 and can have a variety of distributions, whether arranged symmetrically or not, and/or whether arranged in a given portion of the airfoil such as the trailing edge.

Figure 8:
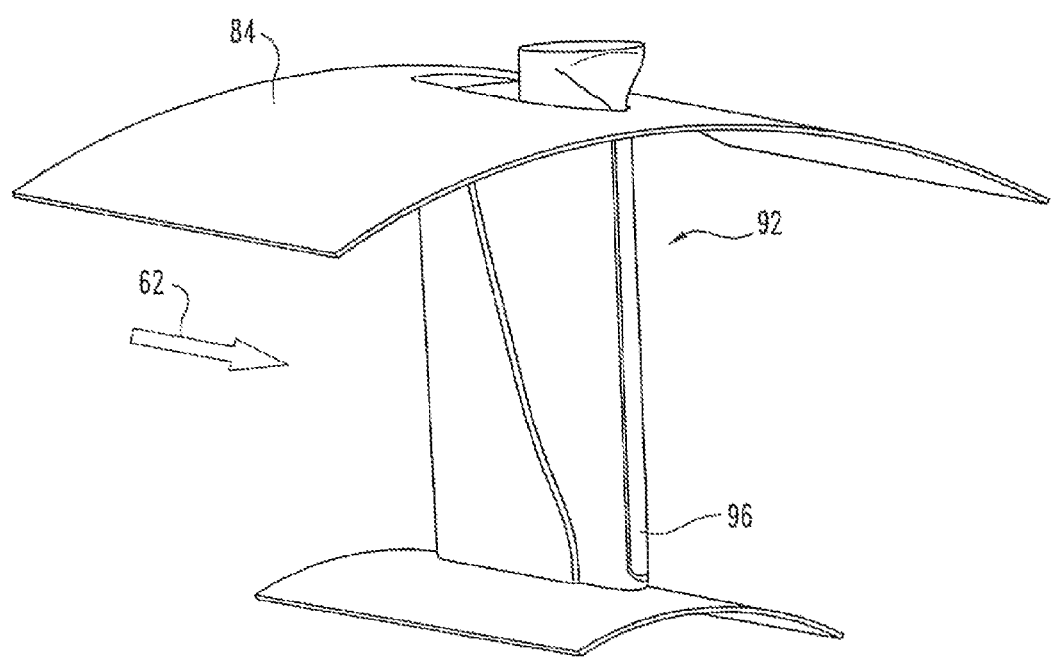
FIG. 8 depicts an embodiment of an afterburner flame holder.

Turning to FIG. 8, another embodiment of afterburner vane 92 is shown in which a discharge slot 96 is formed at a trailing edge portion of the afterburner vane 92. The discharge slot 96 generally extends along the majority of the span of the afterburner vane 92 and is located at the trailing edge of the afterburner vane 92, but other variations are also contemplated herein. For example, the afterburner vane 92 can include a discharge slot that extends only over a portion of the span of the afterburner vane 92 and the discharge slot 96 can be formed at another location in the afterburner vane 92 other than at the trailing edge, etc. Furthermore, the discharge slot 96 can have an internal geometry that assists in providing an angular offset of a discharge of hot products of combustion from the afterburner combustor 68 relative to the afterburner vane 92. Such an angular offset can be used to impart and/or discourages swirl motion of the working fluid 62.

Figure 9:
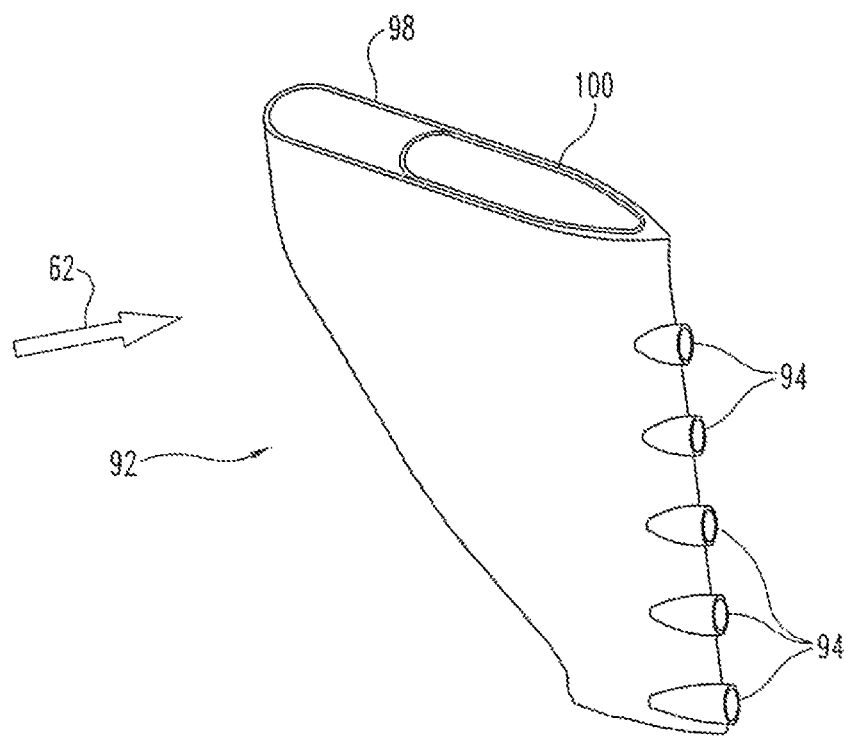
FIG. 9 depicts an embodiment of a cooled afterburner flame holder.
Figure 10:
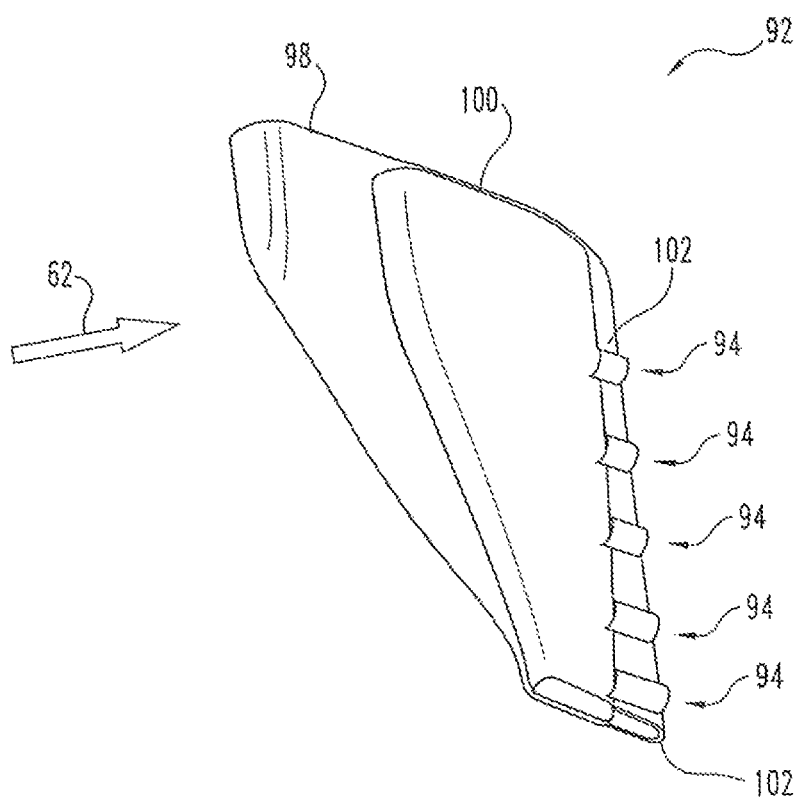
FIG. 10 depicts an embodiment of a cooled afterburner flame holder.

Some embodiments of the afterburner vanes 92 can include an internal cooling passage structure to convey a cooling fluid that can be used alleviate high temperatures associated with hot products of combustion received from the afterburner combustor 68. FIGS. 9 and 10 depict one embodiment of afterburner vane 92 having a cooling passage 98 located on an upstream side of a hot passage 100, the hot passage 100 of which is used to receive hot products of combustion from the afterburner combustor 68. The relative sizes and placement of the cooling passage 98 and hot passage 100 can vary in any given embodiment. The cooling passage 98 can be in flow communication with the bypass duct 58 such that a cooling fluid originates from the bypass duct 58 in some embodiments, however, the cooling fluid can originate from other locations. To set forth just one non-limiting example, the cooling fluid used in the cooling passage 98 can originate from the compressor 52 such as the compressor discharge.

FIG. 10 shows a cutaway of the afterburner vane 92 where it can be seen that the cooling fluid that is conveyed by cooling passage 98 exits in an annular cooling slot 102 formed around the exterior of discharge openings 94. Cooling fluid can flow through annular cooling slots 102 at any variety of flow rates, pressures, and temperatures. The cooling slot 102 can have any shape and in general will include a contour over at least a portion that mimics the contour periphery of the discharge openings 94. The annular cooling slot 102 is generally shown as being equally distributed about an external surface of the discharge opening 94, but it will be understood that the annular cooling slot 102 can have any variety of offsets around the periphery of the discharge openings 94. In some forms, the cooling slot 102 can be an annular arrangement of segmented cooling slots 102 in which the segmented cooling slots 102 can, but need not, have equal dimensions. Furthermore, the cooling slots 102 associated with each individual discharge opening 94 can be the same, or can be different.

In the embodiments of afterburner vane 92 having a discharge slot 96, the cooling slot 102 can be arranged on either or both long sides of the slot 102. In some forms the cooling slot 102 can extend around substantially the entirety of the discharge slot 96. The cooling slot 102 therefore can have opposing sides on both the long and short sides of the cooling slot 102. The cooling slot 102 can have the same offset along the entire length of the discharge slot 96, but in some embodiments the cooling slot 102 can have a variable offset. As above, the cooling slot 102 can have any shape and in general will include a contour over at least a portion that mimics the contour periphery of the discharge slot 96. Other variations of the cooling slot 102 associated with a discharge slot 96 will also be appreciated similar to those variations described above with regard to the annular cooling slot 102.

Figure 11:
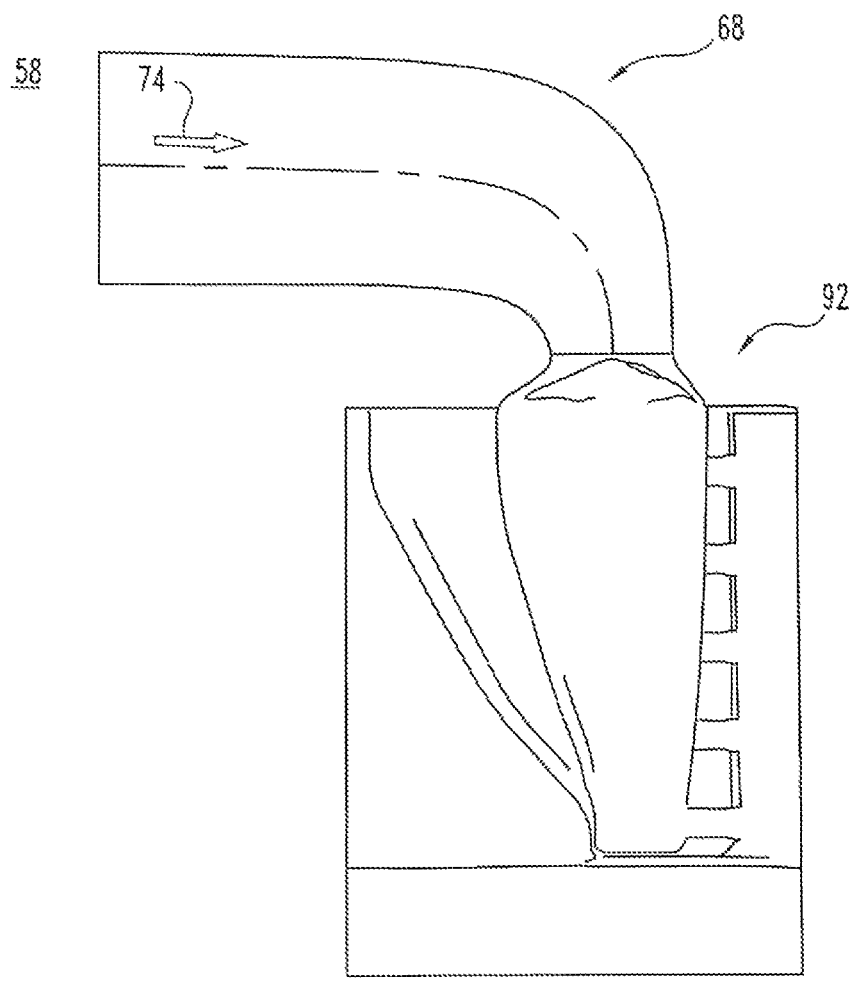
FIG. 11 depicts an embodiment of an afterburner flame holder.

Any of the embodiments of the afterburner vanes 92 can be coupled with other types of afterburner combustors 68. For example, FIG. 11 depicts an embodiment of afterburner vane 92 coupled with an afterburner combustor in the form of the can combustor 68. As will be appreciated, individual can combustors 68 can be associated with each of the individual afterburner vanes 92. The can combustors 68 can be oriented similar to other of the afterburner combustor 68 described above. For example, the can combustor 68 can be oriented to receive a bypass flow from the bypass duct 58, and in some applications the can combustor 68 is located in the bypass duct as shown, but other variations are appreciated given the variations described above with respect to the afterburner combustor 68.

Figure 12:
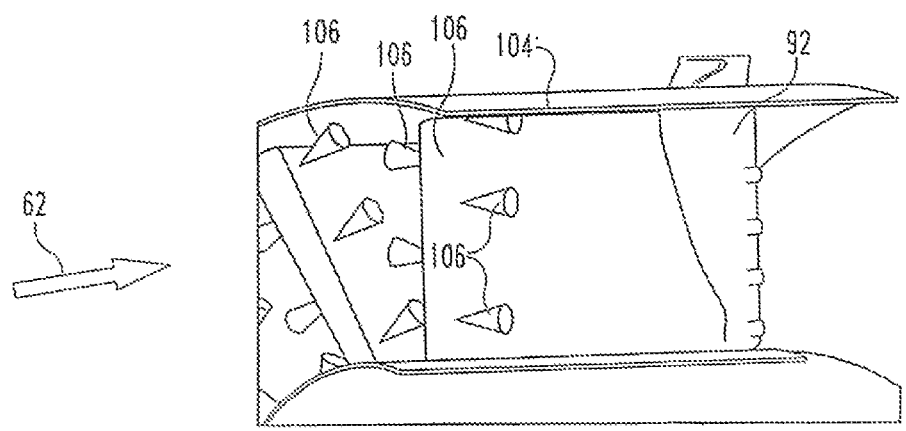
FIG. 12 depicts an embodiment of an afterburner.

Turning now to FIG. 12, one embodiment of the afterburner vane 92 is shown coupled with an upstream vane portion 104 which includes a plurality of fuel injection openings 106. The illustrated embodiment includes a number of cone shaped fuel patterns associated with the fuel injection openings 106, but it will be appreciated that such pattern is shown only for ease of illustration and no limitation is intended regarding any particular fuel pattern associated with any given variation of the fuel injection openings 106. The upstream vane portion 104 can be the same structure that forms the afterburner vane 92, but in other embodiments the upstream vane portion 104 can be separate from the afterburner vane 92. In still other embodiments, the upstream vane portion 104 can stand apart from the afterburner vane 92.

The fuel injection openings 106 are distributed around the upstream vane portion 104 sufficient to deliver a quantity of fuel to be mixed with the working fluid 62 in preparation for being combusted as a result of interaction with a jet of hot products of combustion generated by the afterburner combustor 68 and delivered via the afterburner vanes 92. In this way, the hot products of combustion produced by the afterburner combustor 68 and delivered via the afterburner vanes 92 act as a pilot flame to ignite a main mixture of fuel delivered via fuel injection openings 106 and the working fluid 62. The fuel injection openings 106 in the upstream vane portion 104 can have the same orientation, geometry, etc. but in some embodiments the fuel injection openings 106 can have varying orientations, geometries, etc. Any number of fuel injection openings 106 can be provided either side of the upstream vane portion 104. In some embodiments, fuel injection openings 106 may be limited to one side of upstream vane portion 104. In still further embodiments, fuel injection openings 106 may vary between any individual vane 92.

As will be appreciated, the embodiment shown in FIG. 12 can be used with the afterburner combustors described above, whether those afterburner combustors are in the form of a toroidal combustor or a can combustor. As will also be appreciated, the embodiment depicted in FIG. 12 in which the afterburner vane 92 is shown having a plurality of discharge openings 94 is only one non-limiting embodiment of the vane 92 that can be used with the upstream vane portion 104. For example, the embodiment of the afterburner vane 92 having a discharge slot 96 can also be used with the upstream vane portion 104.

Figure 13:
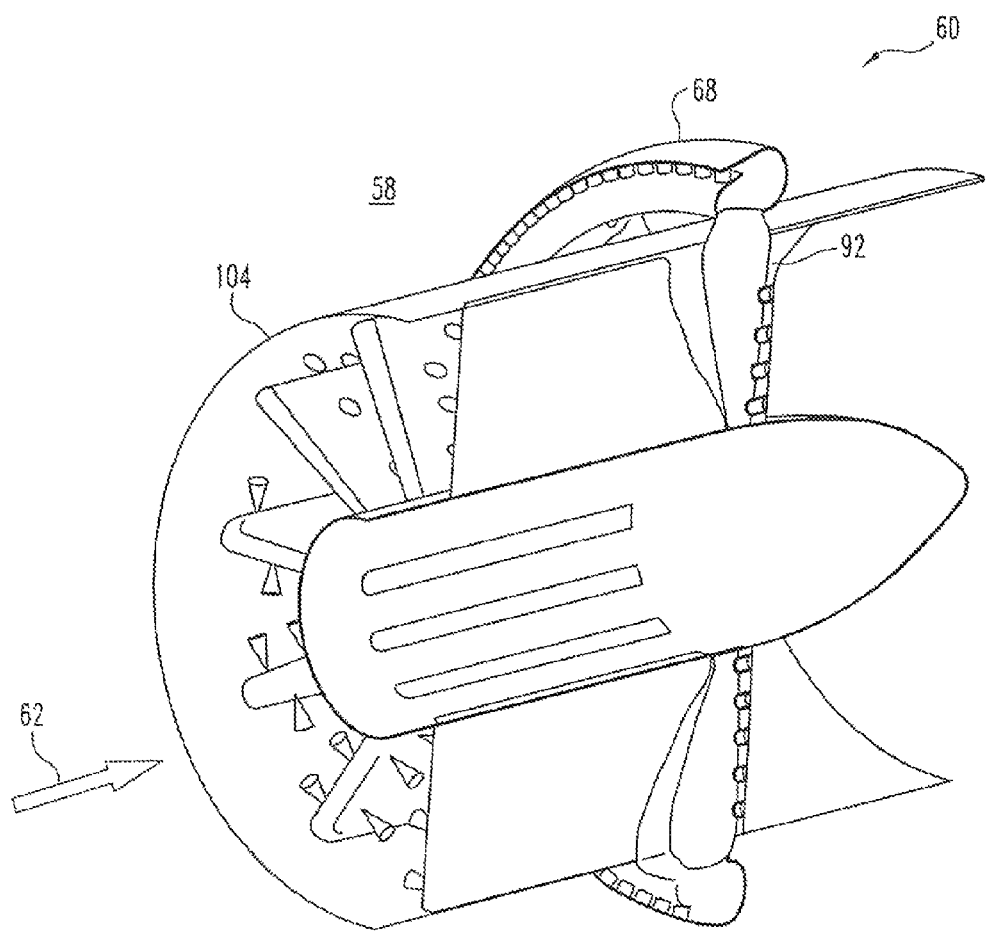
FIG. 13 depicts an embodiment of an afterburner.

Turning now to an embodiment of the afterburner 60 illustrated in FIG. 13, an embodiment of the afterburner combustor 68 is shown coupled with an embodiment of the afterburner vane 92 and an embodiment of upstream vane portion 104. It will be appreciated that any variety of combinations can be created by pairing any given embodiment of the afterburner combustor 68 with any given embodiments of the afterburner vane 92 as well as any given embodiments of the upstream vane portion 104.

Figure 14:
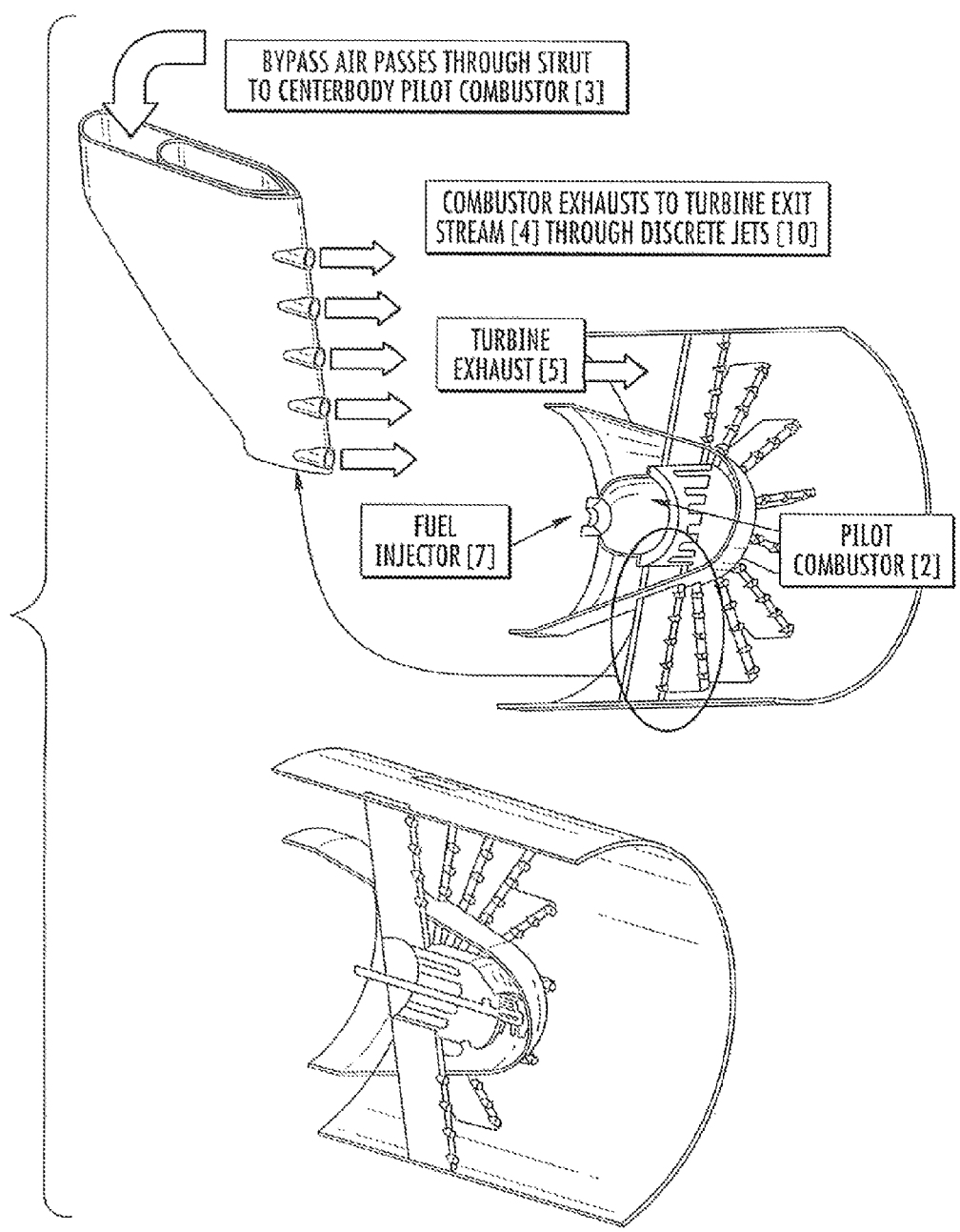
FIG. 14 depicts embodiments of a centerbody afterburning combustor.

FIG. 14 depicts two separate embodiments for a pilot combustor located in a centerbody of the gas turbine engine. The pilot combustor is in the form of a central can combustion system and includes a liner assembly, a fuel injector assembly, and an end plate assembly. The liner assembly includes a central swirler, a rounded or quarl dome, and a liner with sidewall primary air jets. The liner is conventionally cooled with long angle diffusion holes or other conventional means. Fuel injection is achieved by a central "toadstool" vaporizer that delivers a partially vaporized fuel/air mixture directed upstream towards the dome with a flow compatible with the flow field established by the dome swirler and sidewall jets. The central vaporizer tube extends a short distance upstream of the dome swirler and assembles consistently to a single radial fuel injector tube with central fuel injector orifice(s) supplying fuel to the vaporizer tube. Thus, the fuel is airborne to the vaporizer tube. The fuel injector is supplied by a fuel line routed out to the engine outer diameter through the cold region of a rear frame strut. Other fuel injectors could also be used including conventional pressure swirl or air blast fuel injectors.

The burner is ignited with a long street torchy igniter. The torch igniter may be inserted from the engine outer diameter into the liner at a suitable location for ignition. The torchy igniter is located in a rear frame strut cold area. In some embodiments, a spark igniter could be utilized.

With reference to FIG. 14, the pilot hot gas is delivered to a stabilizing gas manifold as contained in each of typically sixteen struts and then exhausted as discrete stabilizing jets or slots according to the jet stabilized augmenter. The stabilizing gas structure is actively cooled to contain the hot stabilizing gas. The stabilizing gas manifolds are connected to a flanged single manifold that mounts the pilot liner and endplate assemblies. The removal of the endplate exposes the pilot burner and stabilizing gas system. The liner assembly can then also be removed for detailed inspection, maintenance, or replacement. With the burner removed, the fuel injector orifices are exposed for inspection and cleaning.

The bottom embodiment shown in FIG. 14 depicts a pilot can configuration with pilot burner flows reversed to reduce centerbody space requirements. The overall flow path in burning strategy is the same as the embodiment depicted at the top of FIG. 14 with the hot piloting gas delivered to a single manifold supplying several stabilizing beams and stabilizing jets or slots, as described herein. FIG. 14 illustrates the stabilizing beams vane manifolds and stabilizing jets. Additional figures described further below will illustrate further features.

The reverse flow configuration results in the offset between the engine plane where hot torch or spark ignition and pilot burner fuel to be readily provided and where these are required, near the front end of the burner. These items are conveyed to the required locations by a central "facility tube" with a central passage conveying hot torch ignition gas and surrounding fuel passages that also provide cooling of the facility tube under burning conditions. The ignition gas is discharged through several holes at the plane suitable for burner ignition. The fuel is delivered to an air blast fuel injector as illustrated, or another fuel injector such as a vaporizer, as previously discussed. Refractory insulation could be used to control the facility to working temperatures and to maintain torch ignition gas temperature for ignition. Alternatively and/or additionally, the facility tube could deliver a high electrical voltage for spark ignition.

As illustrated at the top of FIG. 14, the reverse flow burner has the following removable parts: a burner case, a combustion lighter, and a fuel injector. Also as illustrated in FIG. 14, bypass air is received in the upper portion of the vane and passes through the strut to the centerbody pilot combustor. The illustration at the bottom of that FIG. 14 depicts a reverse flow pilot combustor.

In operation the pilot burner combustion air is fed by, for example, the fan bypass stream and exhausts to the turbine exit stream. Air enters the pilot combustor through a conventional dome swirler. Fuel is injected at the combustor dome. The air/fuel mixture reacts within the combustor before exhausting to the turbine exit stream. This exhaust exits through discrete jets as shown in the figure.

According to an aspect of the present disclosure, an apparatus may include a gas turbine engine and a toroidal afterburner combustor. The gas turbine engine may include a core flow path and a bypass flow path. The toroidal afterburner combustor may be structured to receive working fluid from the bypass flow path. The toroidal afterburner combustor may be oriented around an axis of revolution. The toroidal afterburner combustor may include an annular inlet positioned on a first lateral side to feed a flow of working fluid to a top region of the combustor, a combustion chamber displaced laterally from the annular inlet and shaped to receive the working fluid at the top region, and an outlet positioned on the first lateral side of the combustor and located radially beneath the annular inlet. The annular inlet may have a plurality of swirler vanes oriented to impart a circumferential flow component to the working fluid. The combustion chamber may have a curved far wall that acts to turn the working fluid downward and may form a circumferential vortex of flow. The outlet may be structured to deliver products of combustion in a radially inward direction.

In some embodiments, the outlet may be annular in shape. The outlet may include a plurality of discrete outlets. The gas turbine engine may further include a plurality of vanes extending between walls of a flow path radially offset from the bypass flow path. The plurality of vanes may receive products of combustion from the plurality of discrete outlets.

In some embodiments, the toroidal afterburner combustor may include a fuel injection opening structured to deliver fuel between neighboring swirler vanes. The apparatus may further include a protrusion within an interior of the toroidal afterburner combustor structured to isolate an exhaust region of the toroidal afterburner combustor from the combustion chamber. In some embodiments, the apparatus may further include an air injector positioned at the bottom of the toroidal afterburner combustor and located such that an injected air separates the combustion chamber from an exhaust region of the toroidal afterburner combustor.

According to another aspect of the present disclosure, an apparatus may include a gas turbine engine, an afterburner combustor, and a plurality of afterburner jet vanes. The gas turbine engine may have a flow path structured to convey a working stream that includes products of combustion from a primary combustor. The gas turbine engine may have a bypass ratio defined by a bypass passage located downstream of a fan. The bypass passage may be structured to convey a bypass working fluid. The afterburner combustor may be structured to receive bypass working fluid and combust a mixture of the bypass working fluid and fuel. The afterburner combustor may be configured with an exit through which passes an afterburner hot gas flow. The plurality of afterburner jet vanes may be distributed downstream of and in fluid communication with a turbine. Each of the plurality of afterburner jet vanes may include an internal cooling passage structured to convey a cooling fluid and an internal hot flow passage in fluid communication with the exit of the afterburner combustor and structured to convey a hot flow from the afterburner combustor to an exit aperture from which the hot flow is discharged from the jet vanes. The exit aperture may have a peripheral shape and a cooling slot disposed on opposing sides of the exit aperture having a contour that substantially matches the peripheral shape of the exit aperture.

In some embodiments, the afterburner combustor may be located in the bypass passage. In some embodiments, the afterburner combustor is a toroid combustor having an annular inlet in which is disposed a plurality of swirl vanes.

In some embodiments, the afterburner combustor may be an array of can combustors. The exit aperture may be formed in a protrusion that extends away from a surface of each of the plurality of afterburner jet vanes. The cooling slot may be an annular cooling slot disposed about the exit aperture.

In some embodiments, the exit aperture may be a slot formed in a trailing edge portion of each of the plurality of afterburner jet vanes. The cooling slot may include a first slot side and a second slot side. In some embodiments, the cooling slot may include a third slot side positioned opposite a fourth slot side such that the cooling slot forms a four sided cooling slot that substantially surrounds the exit aperture.

According to another aspect of the present disclosure, an apparatus may include a gas turbine engine, an afterburner combustor, and a plurality of jet pilot vanes. The gas turbine engine may have a core passage structured to flow products of combustion from a combustor and a bypass passage structured to flow a working fluid that originates from a fan driven by the gas turbine engine. The afterburner combustor may have an inlet structured to receive working fluid from the bypass passage and a fuel injector structured to deliver fuel to be mixed with and combusted with the working fluid. The plurality of jet pilot vanes may be arrayed in downstream fluid communication with the core passage and each may have a series of protrusions that extend from respective surfaces of the plurality of jet pilot vanes. The protrusions may define apertures from which hot products of combustion from the afterburner combustor are delivered and merge with the products of combustion from the combustor of the core passage.

In some embodiments, the series of protrusions may be distributed along respective spans of the plurality of jet pilot vanes. The series of protrusions may include at least two protrusions having different angular offsets relative to a chord line of each of the plurality of jet pilot vanes.

In some embodiments, at least one cooling flow exit aperture may be formed around a protrusion of the series of protrusions. The at least one cooling flow exit aperture may be annular in shape.

In some embodiments, the afterburner combustor may include an annular inlet having a plurality of inlet vanes that impart a circumferential movement to a fluid flow within the afterburner combustor. The afterburner combustor may include a combustion region characterized by a circulation in a first direction and an exit flow region characterized by a circulation in direction opposite the first direction.

According to another aspect of the present disclosure, an apparatus may include a gas turbine engine, an afterburner combustor, and a pilot vane. The gas turbine engine may have a turbine exhaust passage structured to flow products of combustion developed from a combustor and passed to a turbine as well as a bypass passage structured to flow a working fluid that bypasses a core of the gas turbine engine. The afterburner combustor may include an annular swirl combustion chamber and a plurality of swirl vanes positioned in an inlet to provide circumferential rotation of a fluid within the annular swirl combustion chamber. The afterburner combustor may have an inlet structured to receive working fluid from the bypass passage and a fuel injector structured to deliver fuel to be mixed with and combusted with the working fluid. The pilot vane may be in downstream fluid communication with the turbine exhaust passage and may have a trailing edge slot in fluid communication with the afterburner combustor. The trailing edge slot may define an opening through which hot products of combustion from the afterburner combustor are delivered and merge with the products of combustion from the combustor of the turbine exhaust passage.

In some embodiments, the annular swirl combustion chamber may be located in the bypass passage. The afterburner combustor may include an outlet positioned on a bottom of the afterburner combustor in communication with the pilot vane.

In some embodiments, the trailing edge slot may be a single slot that extends along substantially the entirety of the span of the pilot vane and may further include a cooling slot formed in the shape of a periphery of the single slot. The inlet and an outlet of the afterburner combustor may be disposed on the same lateral side of the afterburner combustor. The afterburner combustor may include the annular swirl combustion chamber and an annular swirl exit region.

In some embodiments, the annular swirl exit region may be formed through physical interaction with a wall protruding into an interior of the afterburner combustor. The annular swirl exit region may be formed through fluidic injection.

According to another aspect of the present disclosure, an apparatus may include a turbofan engine and an afterburner. The turbofan engine may have a compressor, combustor, and turbine used to generate power as well as a bypass passage that defines the turbofan engine that is structured to bypass a quantity of air around the combustor. The turbine may be configured to deliver an expanded working fluid flow to a discharge passage. The afterburner may be positioned downstream of the combustor and may be structured to combust a mixture of fuel and air. The afterburner may include a toroidal pilot combustor and a pilot combustor vane. The toroidal pilot combustor may include an annular inlet, an exit, and a circulation chamber in fluid communication between the annular inlet and the exit. The annular inlet may be disposed on one side of the toroidal pilot combustor and may be structured to receive the air from the bypass. The annular inlet may be positioned above an outlet of the toroidal pilot combustor and may have a plurality of vanes oriented to provide a circumferential swirl to the air entering the toroidal pilot combustor. The pilot combustor vane may be structured to receive products of combustion from the exit of the toroidal pilot combustor and may have an exit discharge oriented to eject the products of combustion into the discharge passage.

In some embodiments, the exit of the toroidal pilot combustor may be an annular shaped exit. The toroidal pilot combustor may be located in the bypass passage.

In some embodiments, the apparatus may include a plurality of pilot combustor vanes. The exit of the toroidal pilot combustor may include a plurality of exits structured to feed a plurality of pilot combustor vanes distributed in the discharge passage downstream of the turbine.

In some embodiments, a first one of the plurality of pilot combustor vanes may include a trailing edge that includes a plurality of axially aligned exits. The axially aligned exits may protrude from a surface of the pilot combustor vane.

In some embodiments, the pilot combustor vane may include an internal cooling passage structured to convey a cooling fluid in thermal contact with an internal passage that conveys the products of combustion to the exit discharge. An annular cooling fluid exit may be located around the exit discharge such that the cooling fluid that is conveyed through the cooling passage exits around the exit discharge that flows the products of combustion.

In some embodiments, the toroidal pilot combustor may include a plurality of fuel injection locations located between neighboring vanes of the plurality of vanes. The pilot combustor vane may include an upstream portion having a plurality of fuel exit apertures through which is discharged a fuel to be mixed with the expanded working fluid flow from the turbine.

According to another aspect of the present disclosure, an apparatus may include a gas turbine engine, an afterburner combustor, and a plurality of afterburner jet vanes. The gas turbine engine may have a flow path structured to convey a stream that includes products of combustion from a primary combustor. The afterburner combustor may be structured to receive a working fluid and may combust a mixture of the working fluid and fuel. The afterburner combustor may be configured with an exit through which passes an afterburner hot gas flow. The plurality of afterburner jet vanes may be distributed downstream of and in fluid communication with a turbine. Each of the plurality of afterburner jet vanes may include an internal cooling passage structured to convey a cooling fluid and an internal hot flow passage in fluid communication with the exit of the afterburner combustor and structured to convey a hot flow from the afterburner combustor to an exit aperture from which the hot flow is discharged from the jet vanes. The exit aperture may have a peripheral shape and a cooling slot is disposed on opposing sides of the exit aperture having a contour that substantially matches the peripheral shape of the exit aperture.

In some embodiments, the afterburner combustor may be located in the tail cone. The exit aperture may be formed in a protrusion that extends away from a surface of each of the plurality of afterburner jet vanes. The cooling slot may be an annular cooling slot disposed about the exit aperture.

In some embodiments, the exit aperture may be a slot formed in a trailing edge portion of each of the plurality of afterburner jet vanes. The cooling slot may include a first slot side and a second slot side. The apparatus may further include a third slot side positioned opposite a fourth slot side such that the cooling slot forms a four sided cooling slot that substantially surrounds the exit aperture. The afterburner combustor may be a can combustor located in a centerbody of the gas turbine engine.

While the invention has been illustrated and described in detail in the drawings and foregoing description, the same is to be considered as illustrative and not restrictive in character, it being understood that only the preferred embodiments have been shown and described and that all changes and modifications that come within the spirit of the disclosure are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the disclosure, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An apparatus comprising:
   a gas turbine engine having a core flow path, a bypass flow path, and an afterburner flame holder; and
   a toroidal afterburner combustor pilot structured to receive working fluid from the bypass flow path, the toroidal afterburner combustor pilot oriented around an axis of revolution and having:
   an annular inlet positioned on a first lateral side to feed a flow of working fluid to a top region of the toroidal afterburner combustor pilot, the annular inlet having a plurality of swirler vanes oriented to impart a circumferential flow component to the working fluid;
   a combustion chamber displaced laterally from the annular inlet and shaped to receive the working fluid at the top region, the combustion chamber having a curved far wall that acts to turn the working fluid downward and form a circumferential vortex of flow; and
   an outlet positioned on the first lateral side of the toroidal afterburner combustor pilot and located radially beneath the annular inlet, the outlet structured to deliver products of combustion in a radially inward direction into the afterburner flame holder.

2. The apparatus of claim 1, wherein the outlet is annular in shape.

3. The apparatus of claim 1, wherein the outlet includes a plurality of discrete outlets.

4. The apparatus of claim 3, wherein the gas turbine engine further includes a plurality of flame holders extending between walls of a flow path radially offset from the bypass flow path, and wherein the plurality of flame holders receive products of combustion from the plurality of discrete outlets.

5. The apparatus of claim 1, wherein the toroidal afterburner combustor pilot includes a fuel injection opening structured to deliver fuel between neighboring swirler vanes.

6. The apparatus of claim 1, further comprising a protrusion within an interior of the toroidal afterburner combustor pilot structured to isolate an exhaust region of the toroidal afterburner combustor pilot from the combustion chamber.

7. The apparatus of claim 1, further comprising an air injector positioned at the bottom of the toroidal afterburner combustor pilot and located such that an injected air separates the combustion chamber from an exhaust region of the toroidal afterburner combustor pilot.

\* \* \* \* \*